United States Patent
Feyerabend et al.

(12)

(10) Patent No.: US 7,333,459 B2
(45) Date of Patent: Feb. 19, 2008

(54) ALLOCATION OF A SERVER ADDRESS TO A TERMINAL

(75) Inventors: Konrad Feyerabend, Bromma (SE); Thorsten Lohmar, Aachen (DE)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 1066 days.

(21) Appl. No.: 10/182,100

(22) PCT Filed: Jan. 18, 2001

(86) PCT No.: PCT/EP01/00545

§ 371 (c)(1),
(2), (4) Date: Oct. 15, 2002

(87) PCT Pub. No.: WO01/56245

PCT Pub. Date: Aug. 2, 2001

(65) Prior Publication Data

US 2003/0058855 A1    Mar. 27, 2003

(30) Foreign Application Priority Data

Jan. 27, 2000    (EP)    ............................ 00101551

(51) Int. Cl.
*H04Q 7/24*    (2006.01)
*H04L 12/28*    (2006.01)
*G06F 15/16*    (2006.01)

(52) U.S. Cl. .............. 370/338; 370/349; 370/389; 709/203; 709/212; 709/217; 709/223

(58) Field of Classification Search ............... 370/338, 370/349, 389; 709/203, 212, 217, 223
See application file for complete search history.

(56) References Cited

U.S. PATENT DOCUMENTS 5,636,371 A * 6/1997 Yu ............................ 703/26

(Continued)

FOREIGN PATENT DOCUMENTS

EP    0 797 342    9/1997

(Continued)

OTHER PUBLICATIONS

Danny Cohen et al.; *"IP addressing and Routing in a Local Wireless Network"*; IEEE Infocom; 1992 conference on computer; pp. 626-632.

(Continued)

*Primary Examiner*—Alpus H. Hsu

(57) ABSTRACT

The present invention relates to a method for allocating an address of a data service offering server to a communication device such as a mobile services device or a SIM card. With the allocation, the server address is selected from a number of address identifiers. Each address identifier identifies a valid server independently of the current server configuration of the communication network. The server address can be combined out of a fixed and a variable portion. Moreover, the address identifiers can be updated, for example, by means of a so-called DNS server. The described server address allocation method improves the scalability of the communication system and offers an efficient measure for load distribution for both the data service offering application servers and for so-called DNS servers. Moreover, the invention relates to a corresponding communication device for allocating a server address, and to a corresponding communication system and computer program.

22 Claims, 5 Drawing Sheets

U.S. PATENT DOCUMENTS

| | | | |
|---|---|---|---|
| 5,734,865 A * | 3/1998 | Yu | 709/250 |
| 5,974,453 A * | 10/1999 | Andersen et al. | 709/220 |
| 6,178,455 B1 * | 1/2001 | Schutte et al. | 709/228 |
| 6,212,563 B1 * | 4/2001 | Beser | 709/227 |
| 6,249,523 B1 * | 6/2001 | Hrastar et al. | 370/401 |
| 6,286,058 B1 * | 9/2001 | Hrastar et al. | 710/8 |
| 6,327,267 B1 * | 12/2001 | Valentine et al. | 370/466 |
| 6,405,253 B1 * | 6/2002 | Schutte et al. | 709/228 |
| 6,578,066 B1 * | 6/2003 | Logan et al. | 718/105 |
| 6,671,716 B1 * | 12/2003 | Diedrichsen et al. | 709/203 |
| 7,020,698 B2 * | 3/2006 | Andrews et al. | 709/223 |
| 7,039,688 B2 * | 5/2006 | Matsuda et al. | 709/220 |
| 7,042,864 B1 * | 5/2006 | Leung et al. | 370/338 |
| 7,085,277 B1 * | 8/2006 | Proulx et al. | 370/395.53 |
| 2002/0152311 A1 * | 10/2002 | Veltman et al. | 709/227 |

FOREIGN PATENT DOCUMENTS

| | | |
|---|---|---|
| EP | 0 892 531 | 1/1999 |
| WO | WO 9639769 A1 * | 12/1996 |
| WO | WO 9826554 A1 * | 6/1998 |
| WO | WO 99/30460 | 6/1999 |
| WO | WO 99/31853 | 6/1999 |

OTHER PUBLICATIONS

ITU-T E.212 Telecommunication Standardization Sector of ITU (Nov. 1998) Series E: Overall Network Operation, Telephone Service, Service Operation and Human Factors Operation, numbering, routing and mobile services—International operation—Maritime mobile service and public land mobile service; The international identification plan for mobile terminals and mobile users.

RFC: 791 "Internet Protocol DARPA Internet Program Protocol Specification"; Sep. 1981; Information Sciences Institute University of Southern California.

RFC 1877 Cobb; "PPP Internet Control Protocol Extensions for Name Server Addresses" Network Working Group Request for Comments: 1877; Dec. 1995.

RFC 2391 Srisuresh; Load Sharing using IP Network Address Translation (LSNAT); Network Working Group; Request for Comments: 2391; Aug. 1998.

Stevens, W. Richard—"TCP-IP Illustrated vol. 1" The Protocol; 1997.

* cited by examiner

ALLOCATION OF A SERVER ADDRESS TO A TERMINAL

FIELD OF THE INVENTION

The invention is based on the field of data communication and relates to a method for allocating a server address to a communication device, to a communication device for requesting a data service by means of an allocated server address, as well as to a communication system, wherein server-based data services can be requested by communication terminals by means of allocated server addresses.

BACKGROUND OF THE INVENTION

An increasing customer demand for data services, wherein communication terminals, in particular mobile phones, are used as data terminal, induce the operators of communication networks to offer their customers internet accesses or own data services by means of so-called application servers, which are attached to their own network operating packet data network (IP), more frequently. Such application servers provide, for example, current news, soccer results, traffic information or market rates. Examples for such services are the IMODE™ service from NTT Docomo, the Sky Walker™ or the Sky Web™ service from the Digital Phone Group.

There are communication terminals such as mobile phones, which are sold by the data service provider and which offer such a special data service. For the call-up thereof said devices often have a simple user interface, such as a separate key on the keyboard, by means of which such a service, e.g. a traffic information service can be requested. If a user, therefore, requests the traffic information service by pressing a key, the mobile phone sends a service request. The addressee of said service request is a corresponding application server, which is identified by its so-called Internet protocol address, hereinafter called IP address. The IP address of said application server, the data service of which can be called up by the mobile phone, is therefore unchangeably stored in a read-only memory of the device. Alternatively, the IP address can also be entered and stored by the user.

An increasing demand for the data service can exhaust the processing capacity of the application server. In this case, the service provider will install an additional application server for this data service in order to satisfy the demand. Said additional application server is identified by another IP address, as different physical servers should not have the same IP address.

In order to allow an additionally installed application server to successfully function as a load distribution measure, a change in the hardware, i.e. the exchange of the corresponding memory chip is required for part of the circulating communication terminals with fixedly stored IP addresses. Alternatively, the production can be changed, so that as a new edition only terminals are manufactured, which contain the IP address of the additional application server. Both alternatives are not very flexible and involve expenses and partly highly logistic labor. The same refers to terminals in case of which the IP address is entered and stored by the user. Beside the work to inform part of the users about the changed IP address, there is an insecurity with regard to the efficiency of the load distribution measure. The respective user is not obliged to change the IP address, as he will still be reaching an application server under the previously known IP address, which offers the desired data service.

A known solution for distributing the load of the data traffic to several servers is offered by the so-called LSNAT method, which is described in the RFC 2391 "Load Sharing using Ip Network Address Translation (LSNAT)" by P. Srisuresh and D. Gan and which was published by the IETF. In this method packet data flows directed to a single IP address of a server are distributed to a pool of servers. The distribution takes place session-oriented by a so-called LSNAT router with the aid of real time load distribution algorithms, such as the so-called Least Load First Algorithm or the so-called Weighted Least Traffic First Algorithm. For this purpose a network address translator NAT translates the IP addresses of the datagrams, i.e. of the data packets containing address and route information.

For using said load distribution method special routers, so-called LSNAT routers are required in the communication network, which causes additional costs. Furthermore, it has to be secured that all data packets of a session are forwarded by the same LSNAT router, which can imply considerable work depending on the existing network architecture. Finally, the applied load distribution algorithm can cause a bottleneck of the system, particularly in systems comprising a large number of servers.

One alternative is the use of symbolic address identifiers for application servers, such as "www.anwendungsserver.de", instead of the IP address, for example "3.1.226.64". These symbolic address identifiers have to be resolved by a so-called DNS server request before calling up the data service. By considering the load situation of the server of the communication system, the DNS server can undertake a load distribution when the symbolic address identifiers are resolved. The system bottleneck is, however, not removed by this solution, but only shifted from the application server to the DNS server. In this case, too, for calling up the DNS server, the terminal requires the IP address thereof. In the case of a high demand for data services the number of DNS server requests augments so that the DNS server can be overloaded.

As was explained above, the capacity enlargement of server-oriented data service requires the addition of more servers. Due to the new IP addresses of said servers, which are thereby inevitably introduced, a measure for distributing the load is necessary. Known methods for load distribution require additional work by the service provider or the network operator, such as the application of special routers on the network side, or the modification of the terminal hardware by the manufacturer or, respectively, the modification of the terminal software by the user.

OBJECT OF THE INVENTION

In accordance therewith it is the object of the invention to provide a method for allocating a server address, a communication device having an allocation device as well as a communication system with servers and communication terminals, so that an easier scalability of the communication system is guaranteed in view of the servers.

According to the invention said object is provided by the teaching of the independent patent claims 1, 12, 20 and 22.

For allocating a server address to a communication device, an address element is selected from a set of k>1 address elements and stored in the communication device, for example, a communication terminal. Said address element is available as server address for the direct addressing of a data service call-up of the server. Advantageously no additional DNS server request is needed, so that a DNS server in the communication system can be waived. Moreover, resources for the data transmission are saved, which is an advantage in view of the bandwidth of the air interface being a small resource, particularly in a cellular mobile services system, which comprises at least one base station being able to send and receive data packets, and which is connected to the servers of the system by a packet data network. Furthermore the direct availability of the address of the application server in the communication terminal has a positive effect on the performance of the total communication system, particularly in view of short response times upon service requests.

An address of a server should basically not be given to different servers twice in a packet data network. It is, however, possible to assign a plurality of different IP addresses to one single server. According to the present invention the set of the k address elements, from which one address element is selected, contains a number n with 1<n<=k of different address identifiers, which designate a number of m with 0<m<=n servers. This allows a simple and flexible scalability of the communication system on the server-side, as by means of each address identifier, which can be selected as address element, a server has a valid identification. Each extension step of the system, from a single server up to a number of servers, which corresponds to the number n of the different address identifiers from the set k, is supported by the communication terminal without necessary additional measures.

The method according to the invention allows, when being applied for a plurality of the communication terminals of a communication system, by means of the respective selection of an address element or, respectively, an address identifier of a server, a load distribution in view of the server-oriented data services of the system, if more than one server is designated by the n address identifiers. The kind of load distribution depends on the used selection process, which can advantageously be pre-specified, for example, by the network operator or the data service provider. The method according to the invention can, therefore, be used for different load profile requirements, as no fixed selection process is prescribed.

The set of the k address elements can also contain the same address identifiers several times. This advantageously allows a weighting of the address identifiers and thereby supports the load distribution. An address identifier identifying a server with a processor performance being higher than that of other servers of the system, can be contained in the set of address elements several times. In dependence on the used selection method said address identifier then has a higher probability of being selected than an address identifier, which is only once contained in the set of address elements. By pre-specifying a corresponding weighting of the address identifiers, the network operator or data service provider can influence the load distribution.

The selection of the address identifiers takes place in a transparent manner for the user of the communication terminal, in other words, the user does not notice the selection, which is convenient for him since he does not have to carry out any configuration works.

The basic method according to the invention can be applied in a flexible manner. It can be performed both in the communication terminal, which comprises a memory for the k address elements, a selection unit for selecting an address identifier and a memory for the selected address identifier, for instance, with each application in the communication system, or in other words, each time the device is switched on, or each time a data service is requested. Also the use during the production of the terminal is feasible, so that the selected address identifier is stored in the terminal during the manufacture thereof.

The invention can advantageously be realized as a computer program. This allows the use of the invention in communication terminals without requiring changes in the hardware. Moreover, the computer program allows the easy and inexpensive performance of tests and simulations during manufacture and development.

Further advantageous embodiments and improvements of the invention are disclosed in the dependent claims.

In an advantageous embodiment the step of selecting additionally comprises reading out a second address identifier and combining the first and second address identifier to form the selected address identifier. Thus a complete address identifier identifying a server consists of a fixed portion, i.e. the second address identifier being fixedly pre-specified in a memory, and a variable portion, i.e. the first address identifier being selected from the set of the k address elements. Thus, the memory space for address identifiers required in the communication terminal is advantageously minimized.

In another advantageous embodiment the server address is an IP address. This allows the use of commercially spread data communication protocols and routers in the communication system, as well as the simple attachment of application servers in the internet.

In an additional advantageous embodiment the first address identifier is a host identifier, and the second address identifier is a network identifier of the IP address of the server. Such a use of the structure of the so-called IPv4 address format allows an easy division of the IP address into a fixed and a variable portion and simplifies thereby the administration of the IP addresses of the servers of the communication network by the corresponding operator.

Particularly the use of a Class C format of an IPv4 address is advantageous, as the number of available host identifiers in this address format is 256, which meets the demands of most of the data service providers or network operators in view of the scalability of the servers.

An advantageous embodiment of the invention offers the selection of the first address identifier by means of a random function. This allows the plurality of the communication terminals belonging to the communication system the easy realization of a load distribution of data service requests by the server, which requests are statistically distributed by the random selection over all occurring address elements k, and thus over all selected address identifiers of the servers in an equal manner.

An additional advantageous embodiment of the invention makes use of an individual numeric identifier present in the communication device. The selection is made by means of a simple modulo calculation. The load profile resulting from said selection method for the plurality of terminals contained in the communication system, or in other words, the load distribution to the servers, depends on the issued identifiers. Particularly, if the used individual identifier is stored on a so-called SIM card of the terminal, the network operator or service provider can influence the load distribution in a simple manner by the selection of the SIM cards issued to the users without depending on the manufacturer of the terminals.

It is, moreover, advantageous if the selected stored address identifier is in alphanumeric plain text, for instance, by using the so-called symbolic notation of the IP address of the server. Even though in this case a DNS server request is necessary for addressing the server, the scaling of the servers of the communication system is considerably more flexible, as the IP addresses of the servers are transparent for the terminal, whereby they can be changed by simple changes of corresponding allocation tables of the DNS server.

It is, furthermore, an advantage that address elements from the set of the k elements or respectively the second, i.e. the fixed address identifier, can be updated. This relieves the network operator or service provider from possible limitations in view of the changes of the server configuration and secures the easy upgradability of the communication system.

It is particularly advantageous that the updating, for instance, by the terminal or the user, can be requested by an address server. In the case of an error the terminal can thereby correct invalid address elements or address identifiers, respectively, or the user can request the current data, for instance, after the terminal had not been used for a longer time.

Finally the storage of the computer program on a computer-readable medium is an advantage, since this enables in an easy way the use of the invention in different devices, such as test systems, simulation systems or machines for the manufacture of terminals.

The invention is hereinafter explained in more detail with reference to the embodiments thereof and to the attached figures.

In the following, the invention will be explained in more detail by means of the figures and different embodiments.

Figure 1:
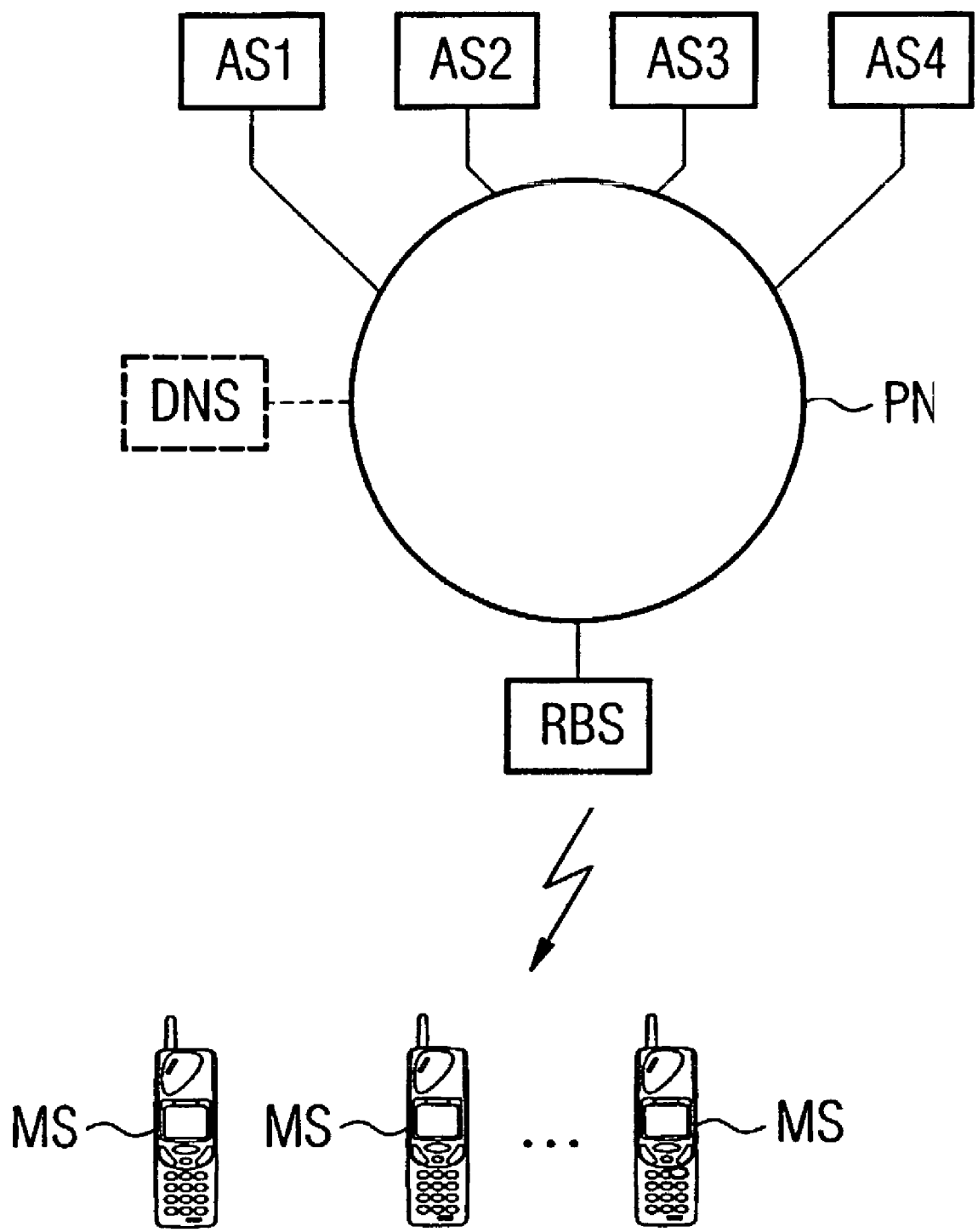
FIG. 1 illustrates a communication system allowing the data service request by means of communication terminals.

FIG. 1 shows a communication system KS with servers AS1, AS2, AS3, AS4, a base station RBS, a packet data network PN and several communication terminals MS. The servers AS1, AS2, AS3, AS4 and the base station RBS are in each case connected with the packet data network PN. The servers AS1, AS2, AS3, AS4, which are addressed by so-called IP addresses, all offer a same data service, for example, market rates, news or traffic information. The communication terminals MS are each adapted to request said corresponding data service from one of the servers AS1, AS2, AS3, AS4. A communication terminal MS sends said data service request to a server address of one of the servers AS1, AS2, AS3, AS4 allocated to the communication terminal by means of one or more data packets. The required packet-oriented data communication takes place with the aid of the base station RBS and the packet data network PN. The allocation of the server address to the communication terminal according to the invention will hereinafter be explained in detail.

The communication system can additionally contain a so-called domain name server DNS, which is connected with the packet data network. As the provision of a DNS server is optional, said server is illustrated by a dotted line.

The domain name server is, for instance, required if symbolic server addresses, e.g. "news.ericsson.se", instead of IP addresses, e.g. "192.50.123.15" are allocated to the communication terminals MS. The resolution of the symbolic address of the server into its IP address required for the transmission of data packets to the corresponding servers AS1, AS2, AS3, AS4 then takes place by requesting the domain name server. Said request is performed by the communication terminal, or alternatively by the base station RBS.

The communication system may, for instance, be a General Packet Radio System GPRS, a Packet Personal Digital Cellular System PPDC or a Univeral Mobile Telecommunication System UMTS. In view of the number of the base stations RBS of the communication system according to the invention there are no limitations. Although FIG. 1 only shows one base station RBS for better understanding, the indicated systems, for example, commonly comprise a plurality of base stations RBS. Also the use of a number of four servers AS1, AS2, AS3, AS4 in FIG. 1 constitutes, as will be explained later, merely one of many configuration possibilities of the communication system by the server.

If in the case of an increasing demand for the offered data service the capacity limit of the connected servers is reached, the data service provider or network operator can avoid a bottleneck by installing one or more additional servers for said data service. In order to secure the scalability of the servers of the communication system, an address space, or in other words, a number of server addresses, is reserved for the servers of the system, which offer the data service. Said addresses are distributed to the servers installed in the respectively updated configuration of the system. This means a server offering the data service can be addressed with each address of the address space independently of the current server configuration. This is possible, as a single server may have several IP addresses. In order to secure the clearness of the addressing, however, a single IP address should not be used for several servers.

Figure 2:
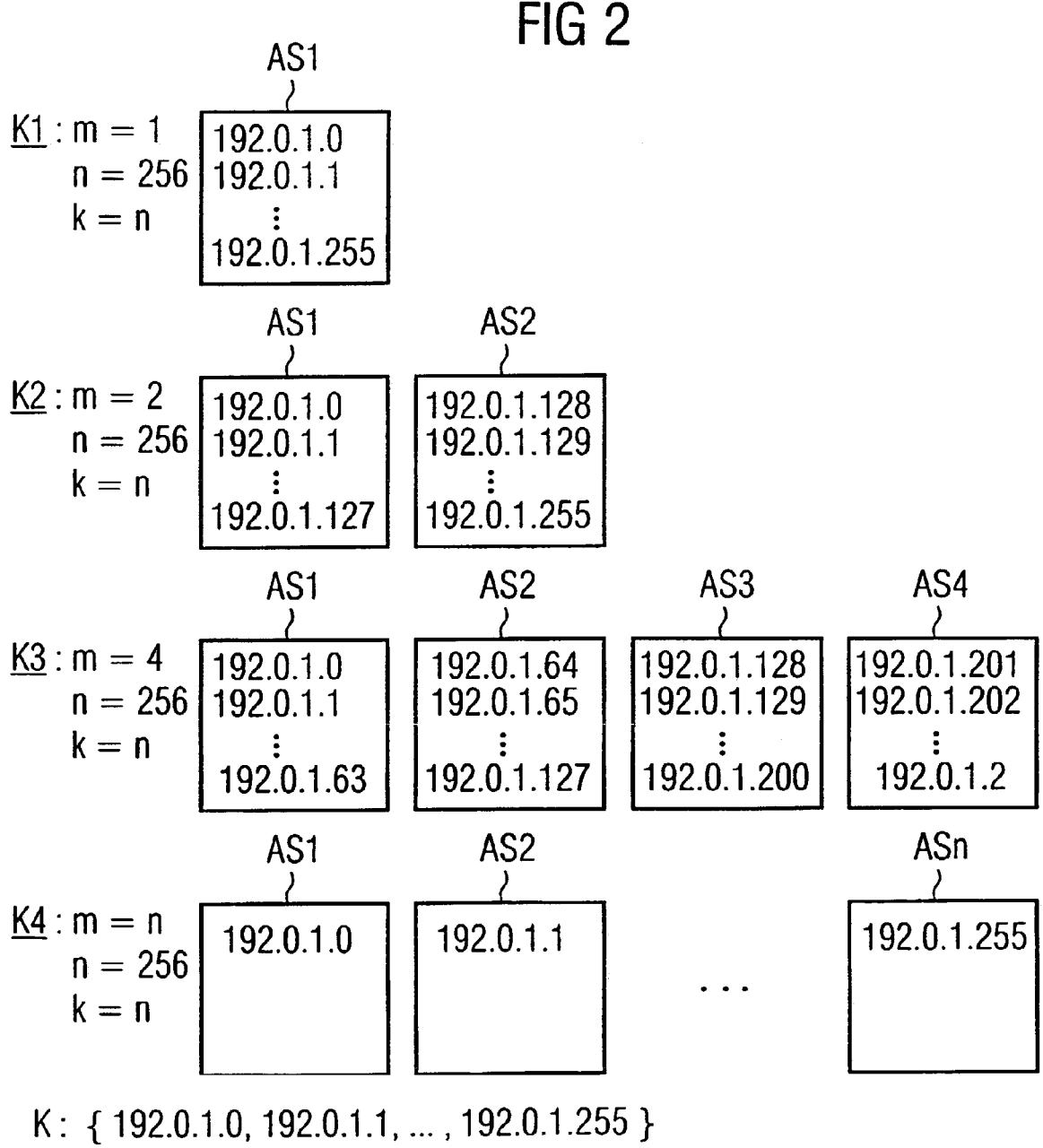
FIG. 2 shows different server configurations with allocated server addresses of a communication system.

FIG. 2 shows as an example different server configurations in each case with an admissible distribution of the server addresses to the servers existing in the respective configuration. The parameter m indicates the number of the servers offering a data service. The number m depends on the respective configuration. The parameter n indicates the number of the different address identifiers, or in other words, the different server addresses being reserved for the servers of said data service. In the indicated example, 256 different address identifiers are reserved for servers offering the data service. The address identifiers in the indicated example are complete IP addresses. The parameter k designates a set of address elements, from which, independently or the respective configuration of the servers, a server address can be selected, which is required for requesting the data service by a communication terminal. In the indicated example each of the reserved different address identifiers is contained in the set once, so that k=n applies. The set k, therefore, contains 256 different IP addresses, namely the address space of 192.0.1.0 to 192.0.1.255.

According to FIG. 2 a single server AS1 in the communication system for the data service, i.e. m=1, is provided in a first configuration K1. Said server can be reached by means of all reserved IP addresses, i.e. by all addresses from 192.0.1.0 to 192.0.1.255. In a second configuration K2 two servers AS1, AS2 offer the data service, i.e. m=2. The existing 256 different IP addresses are now distributed to the two servers AS1, AS2. AS1 has the addresses from 192.0.1.0 to 192.0.1.127 while AS2 has the addresses 192.0.1.128 to 192.0.1.255.

Although the reserved addresses are distributed to the existing servers in equal shares in the indicated exemplary configuration K2, the distribution of the IP addresses to the existing servers of a configuration is generally optional. For reaching a server it has merely to be secured that it has an IP address. As long as the number of the servers used is smaller than the number of available server addresses, i.e. m<n, the data service provider or network operator can orientate the distribution of the IP addresses by the processing capacity of the respective servers, so that a more powerful server has more addresses available than a less powerful server. If the selection of the server addresses for requesting the data service by the respective terminals is subjected to a suited distribution, for example, an equal distribution, a load distribution orientated by the server capacities is thereby achieved.

The possibility of an unequal distribution of the reserved address identifiers to the existing servers is shown by the configuration example K3 with four servers AS1, AS2, AS3, AS4, i.e. m=4. While the 256 IP addresses are distributed to both servers AS1, AS2 in equal shares in K2, the server AS1 in K3 has 64 of the 256 reserved addresses available, namely 192.0.1.0 to 192.0.1.63, the server AS2 has 64 addresses available with 192.0.1.64 to 192.0.1.127 and the server AS3 has 73 addresses available with 192.0.1.128 to 192.0.1.200, while the server AS4 has 55 available with 192.0.1.201 to 192.01.255. With an assumed equal distribution of the server addresses allocated to the communication terminals of the system, and with an assumed equal demand by the users for the data service, the server AS3 will thereby be requested in 73 from 256 cases, while the Server AS4 receives a data service request only in 55 from 256 cases.

The configuration K4 shows the maximum extension step for the indicated example. In this case 256 servers AS1 to Asn are used in the communication system, i.e. m=256. Each server has exactly one IP address, i.e. AS1 has 192.0.1.0, AS2 has 192.0.1.1 up to Asn having 192.0.1.255. The maximum possible configuration depends on the number n of the reserved different IP addresses.

Figure 3:
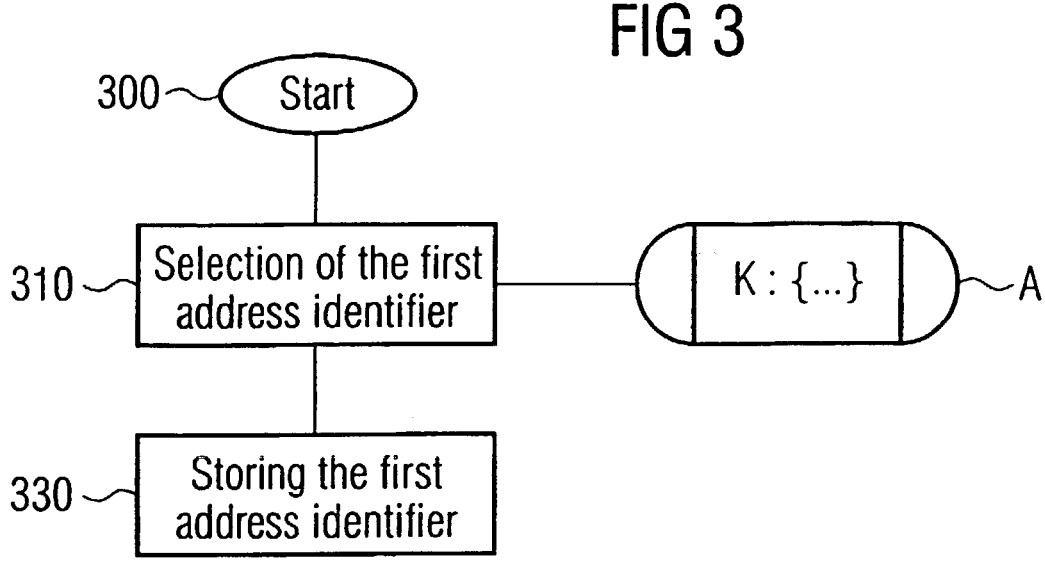
FIG. 3 shows a flow chart of an exemplary selection of an address identifier of a server.

FIG. 3 shows the procedure of the allocation of a server address to a communication device. The communication device can be a communication terminal such as a mobile phone, or a so-called SIM card for a card-based communication terminal. The allocation can, for instance, be performed, or in other words, it can be started 300 with the log-on of the communication terminal in the communication system, in each case prior to a data service request or during the production of the communication terminal or the SIM card.

For the allocation an address identifier is selected 310 from the set of the k address elements A and is stored 330 in the communication device in a next step. The selection can, for example, take place by means of a random function or according to selection rules, which are pre-specified by the network operator or the service provider. Suitable random functions are known to the person skilled in the art. An example for a selection rule is the selection based on the number of items during the production of the communication terminals or SIM cards. In this respect, for example, the first set element of the k address elements can be selected for the first 1000 produced units, the second address element for the second 1000 units etc. The storage of the selected address identifiers can, for example, take place during the production, as read-only storage in a ROM of the communication terminal or on the SIM card. Another possibility is the storage in the form of buffering in a random access memory, i.e. in a so-called RAM, of the terminal or the SIM card. The selection of the address identifiers takes place transparently for the user, or in other words, unnoticed by the user of the communication terminal equipment.

The k address elements of the set, from which the address identifier is selected, are IP addresses in an embodiment according to the invention. A known IP address structure is the 32 bit IPv4 address structure. Such an IP address has four octets forming a non-negative whole number each. Each octet is delimited from other octets by a decimal point (e.g. 193.154.180.123). There are different address classes for the IPv4 format. A class A address contains in its first octet a network identifier and in the remaining 3 octets a host identifier, so that a maximum of $2^{24}$ hosts can be addressed through a class A address. A class B address occupies the first 2 octets with the network identifier and the second further octets with the host identifier so that approximately 64,000 hosts can be distinguished. A class C address finally identifies with the first 3 octets a network and with another octet a host. Therefore, a single class C network can have 256 host addresses. Alternative formats result from the use of so-called sub-networks, which are known to the person skilled in the art. Moreover, also other IP address structures such as IPv6 addresses can be used.

Also the use of so-called symbolic addresses (e.g. "www.ericsson.se") instead of IP addresses is possible for selecting a server address. The address identifier then is present in alphanumeric plain text. The symbolic address is resolved by a DNS server request for addressing the corresponding server, and thus for requesting a data service of the server.

Moreover, the address elements can represent incomplete server addresses. Thus, the selected address allocated to the communication device, which in this case is incomplete, may, for instance, be the network operator of an IP address or a part of a symbolic address. For requesting a data service, said incomplete address can be supplemented or respectively resolved to form a complete address by means of a DNS server request. For this purpose, the incomplete address is sent to the DNS server, which, for instance in dependence on the current load situation of the servers, supplements and returns it.

The set of the k address elements, from which an address identifier is selected, can contain identical address elements several times, so that the value k is larger than n, i.e. larger than the number of the different reserved address identifiers. Thus, in relation to the selection with the pre-specified set of the k address elements, for instance by the network operator or the data service provider, a weighting of the n address identifiers can be effected. If, for example, the selection of the address elements for the communication terminals of the communication system as a total is subjected to an equal distribution, address identifiers occurring several times are stronger weighted than address identifiers being contained in the set once. In other words, in dependence on the used selection method, address identifiers being present in the set of address elements several times are selected more often than address identifiers being present once. By a corresponding pre-specification of the set of the k address elements, therefore, the load distribution of the servers of the communication system can be influenced.

Figure 4:
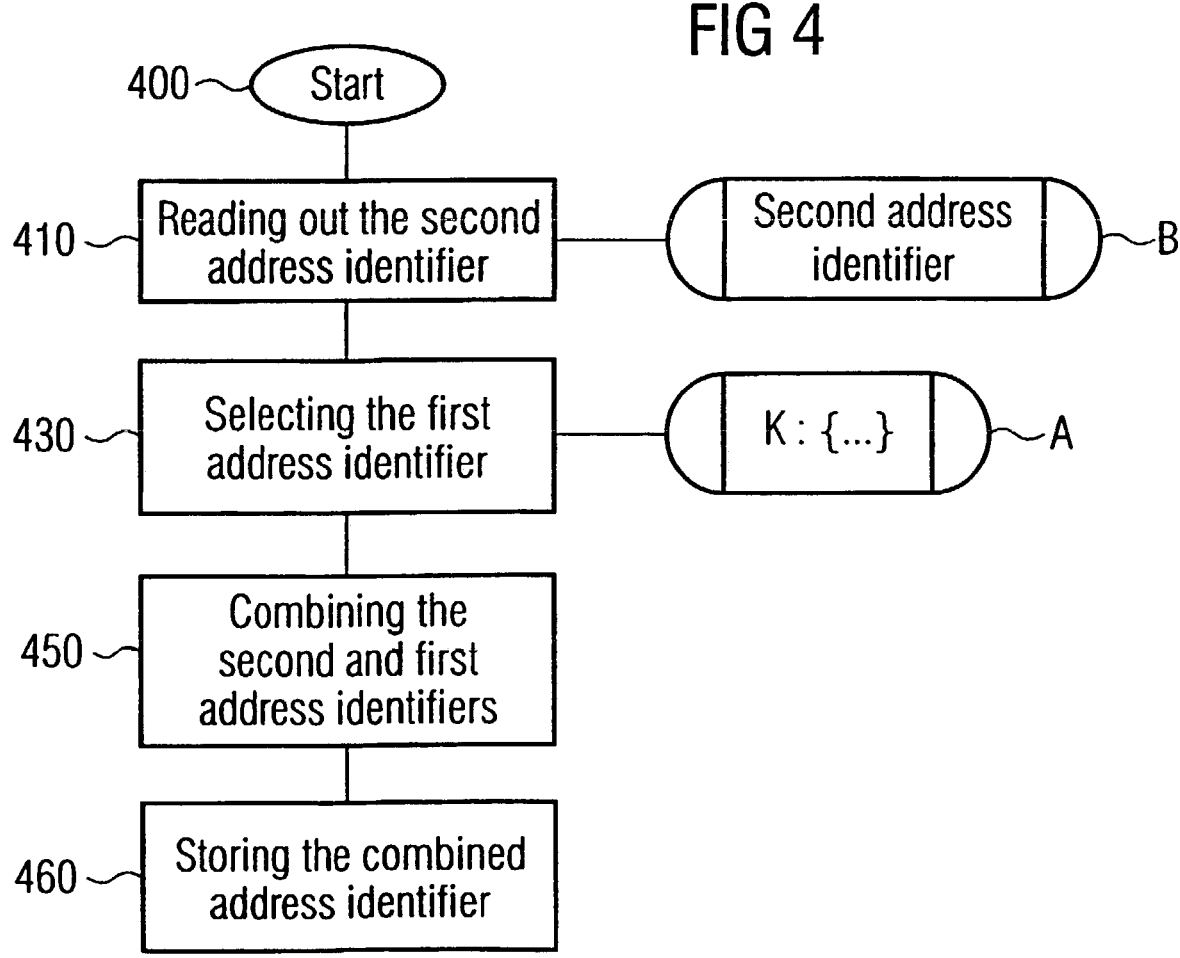
FIG. 4 shows a flow chart of another example of a selection of an address identifier of a server.

FIG. 4 shows an alternative embodiment of the inventive allocation of a server address to a communication device. After the start 400 of the procedure a second address identifier is read out 410 from a memory B, for instance, a ROM. Said second address identifier is, for example, pre-specified by the network operator or the data service provider. Thereafter, a first address identifier is selected 430 from a set of k address elements A, which, for instance, is present in a memory of the communication terminal device. The first and the second address identifiers are then combined 450. The combined address identifier forms the selected address identifier and identifies a server address. It is stored 460 in the communication device.

The second address identifier may, for example, be the network identifier of an IPv4 address, e.g. "192.0.1.". All servers of the communication system offering a data service belong to the so designated network. The set of the k address elements contains a number of host identifiers, i.e. k: {"0", "1", . . . , "255"}, by which the servers are identified within said network. A first address identifier is selected from this set, e.g. by means of a random function, for example "15". The combined address identifiers are stored and form the selected address identifier. In the indicated example this results in "192.0.1."+"15"="192.0.1.15".

Another example is the allocation of a symbolic address. The set of the k address elements contains a variable part of symbolic server addresses, for example, k: {"news1", "news2", "more-news", "hot-news"}, from which a first address identifier is selected, e.g. "hot-news". The fixed part of the symbolic server addresses, e.g. ".ericsson.se", is read our from a memory and forms the second address identifier. The variable and the fixed portion of the symbolic server address are combined. In the example this results in "hot-news"+".ericsson.se"="hot-news.ericcson.se". The two shares thus together form the selected address identifier and are stored as such.

Another embodiment of the present invention (without figure) relates to the updating, in other words, to the modification of the data stored in the communication device being used for selecting a server address. The updating takes preferably place by the reception of the respective data and the corresponding storage of said data in the communication device, in other words, by changing or supplementing said data. The updating can, for example, be requested by an address server DNS of the communication system. It can, among others, be performed upon the occurrence of an error, or in other words, if a data service request by an already selected server address fails, initiated by the network operator or the data service provider or upon the request by a user, for instance, by entering a modification request into the terminal by pressing a correspondingly occupied key. Also an automatic modification, for instance at regular time intervals, can be performed. optionally the allocation of a server address to the communication device can be effected directly after each update of the data present in the communication device.

The modification can, for instance, take place via an air interface of the communication system with the aid of the so-called short message service (SMS), by the use of a so-called MAP (mobile application part) message or by using a proprietary protocol.

One address element or several address elements from the set of the k address elements can be updated, from which a first address identifier is selected, or the total set. If the server address is selected by using a variable and a fixed address part, the stored second address identifier, i.e. the fixed address part, may alternatively or additionally be modified. This enables an efficient re-configuration of the servers, for instance, by updating the network of the servers of the communication system, in other words, by modifying the network identifier stored as fixed address part, with maintaining all host identifiers.

Another embodiment of the invention uses an identifier stored in the communication device for allocating the server address. This can, for example, be a running registration number of the respective communication device. Another possibility is the use of the so-called MSIN (mobile subscriber identity number). The MSIN is part of the so-called IMSI (international mobile station identity), which is standardized by the ITU-T recommendation E.212, and which is commonly contained in terminals or SIM cards of mobile services systems. The MSIN is, for example in Japan, a 6-digit numerical value and serves the exact identification of a communication terminal in a mobile services system.

Figure 5:
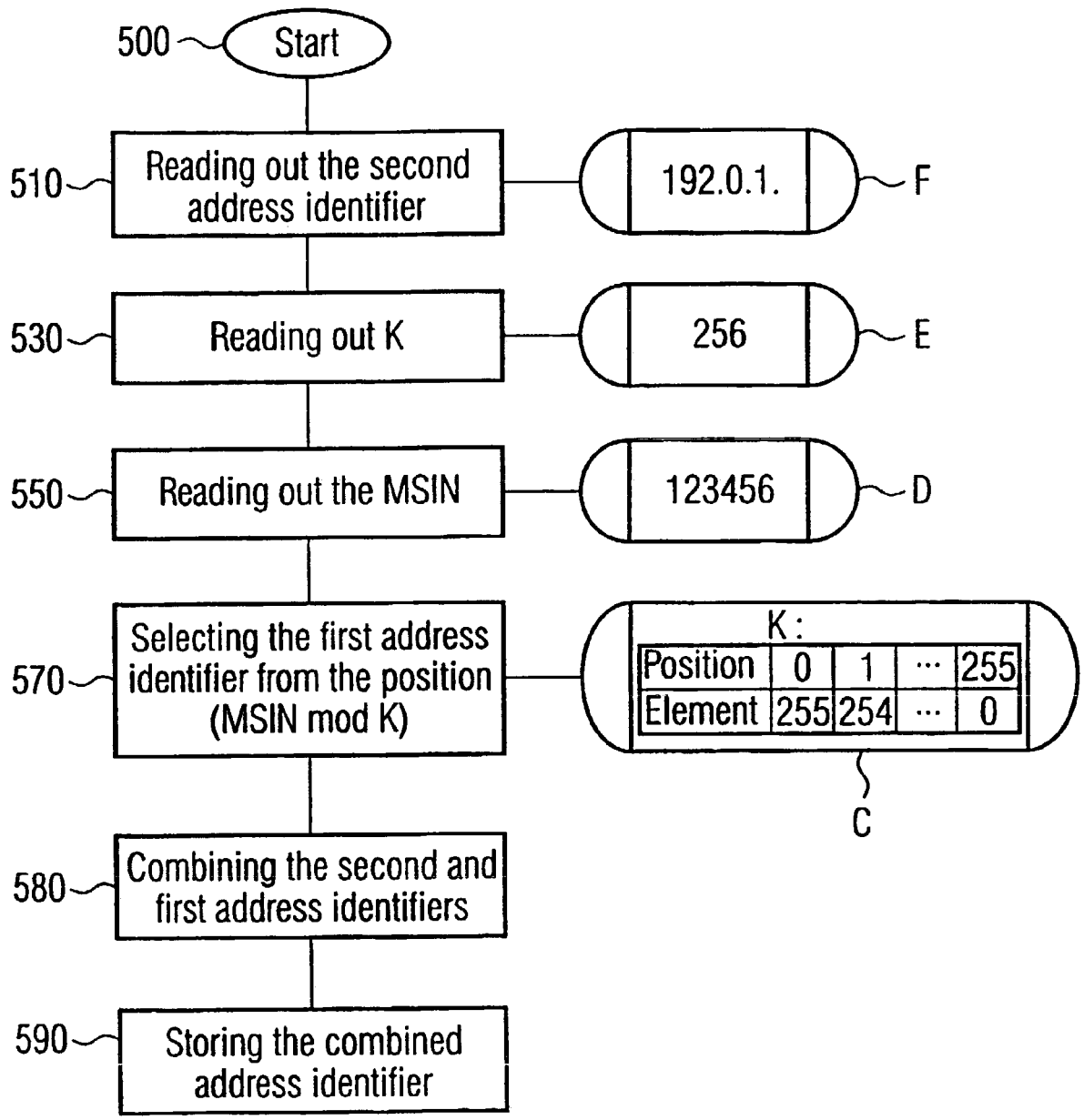
FIG. 5 shows a flow chart of another example of a selection of an address identifier of a server.

FIG. 5 shows a possible procedure of the server address allocation by using the MSIN. After the start 500 of the procedure a second address identifier is read out 510 from a memory F, e.g. "192.0.1.". The number k of the address elements stored in a memory C and addressing the servers in the communication system is read out 530 from another memory E, for instance, "256". In the following, the MSIN is read out 550 from a memory D, e.g. "123456". Thereafter a first address identifier is selected from the stored set of k address elements.

In memory C the position of each address element of the set is exactly determined by a running number. The first address element, e.g. "255", has the position number "0", the last address element, e.g. "0", has the position number of the number k reduced by one, e.g. "255". The selection of the first address identifier takes place by means of calculating the remainder of the division of the MSIN by the number of k of the address elements of the set, in other words, by calculating MSIN mod k, for instance 123456 mod 255=36. The result of this calculation provides the position number of an address element, which is then read out from the memory C by means of said position number, e.g. "219" from position "36". Thereafter, the first and the second address identifiers are combined 580, for example, "192.0.1."+"219"="192.0.1.219" and stored 590 as selected address identifier in the communication device and thus allocated thereto.

In a special embodiment the memory E for the number k of the address elements corresponds to that memory, which has stored the largest position number of the positions of the set of the k address elements. In this case the memory C includes the memory E. When reading out the largest position number ("255" in FIG. 5), the value "1" is then added to the read out value in order to obtain the correct value for k ("256").

Another alternative in the case k=n is the direct selection of the first address identifier by the modulo calculation. The number of the k address elements is thereby stored in memory E. Said address elements correspond to the reserved address identifiers and form a set with integral elements of "0" to n−1. In step 570 the first address identifier is directly selected by the calculation of MSIN mod k. For example, k=n=256 and MSIN=123456 results in the value "36" for the first address identifier. The memory C for the set of the k address elements is not required in this case.

Figure 6:
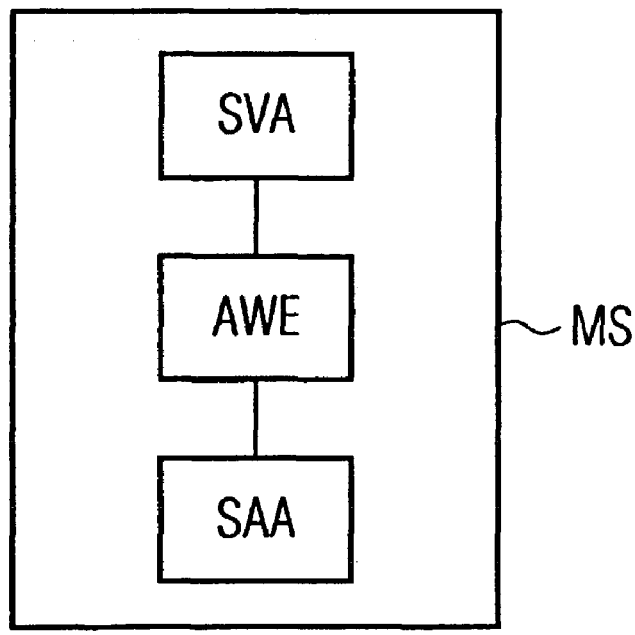
FIG. 6 shows in a simplified illustration a block diagram of a communication device allowing an allocation of a server address.

FIG. 6 shows a communication device MS, to which the address of a data service offering server can be allocated. The communication device MS comprises a memory SVA for a set of k address elements with k>1. The set contains a number n of different address identifiers with 1<n<=k. Each of said address identifiers identifies a server from a set of m servers of a communication system, with 0<m<=n. The communication device MS moreover comprises a selection unit AWE for selecting a first address identifier from the set of the k address elements, as well as a memory SAA for the selected address identifier. Both memories SVA, SAA are connected to the selection unit AWE. The communication device may, for instance, be a mobile phone of a GPRS, PPDC, EDGE or UMTS system, or, for example, a so-called SIM card for a terminal of such a communication system.

In a particular embodiment of the present invention the selection of the first address identifier takes place by means of the selection unit with the aid of a random function. For this purpose the selection unit can, for example, be provided with an interface (not illustrated in the figure) to internal parameters of the communication device or the communication system, for instance the system time, in order to obtain one or more random variables.

Figure 7:
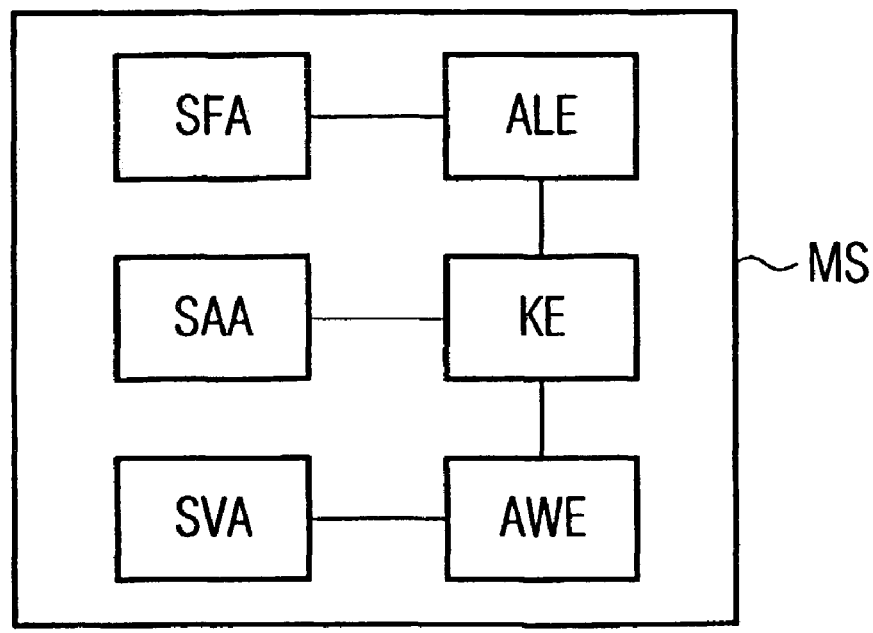
FIG. 7 shows in a simplified illustration another block diagram of a communication device allowing an allocation of a server address.

FIG. 7 shows another embodiment of the present invention. The communication device MS comprises in addition to the elements already known from FIG. 6 a memory for a second address identifier SFA, a read-out unit ALE, which is able to read out the second address identifier from the memory, and a combination unit KE, which can combine the first and the second address identifier. An address identifier combined by the combination unit KE then forms a selected address identifier of a server of the communication system.

For this purpose the read-out unit ALE is connected to the memory SFA and combination unit KE. The combination unit KE is additionally connected to the selection unit AWE and the memory SAA, and the selection unit AWE is additionally connected to the memory SVA.

In the depicted embodiment of the invention the memory SFA contains a fixed address part of a server address as a second address identifier, which is valid for all m servers of the communication system. The memory SVA contains variable address parts of server addresses, which in each case identify one of the m servers of the system. The selection unit AWE can select a first address identifier from the memory SVA. The memory SAA can store the address identifier combined by the combination unit KE from the first and the second address identifier, which consists of a fixed and a variable address part and which forms the selected address identifier.

Additional embodiments according to the invention of the communication device MS are described in the following (without figure).

The communication device MS can additionally comprise a memory for a numeric communication device identifier, e.g. a registration number, an IMSI or an MSIN, as well as a read-out unit for said communication device identifier. The selection unit AWE can perform the selection of the first address identifier by means of a modulo calculation.

Moreover, the communication device MS can be provided with a reception device for receiving updated address elements of the set of the k address elements, for instance, via an air interface of the communication system. A storing device undertakes the storage of the corresponding updated data. Also the updating of the second address identifier can alternatively or additionally take place by means of an additional reception and storing device.

In another embodiment the request for updating the data is effected by a request device of the communication device. For instance, upon the detection of an error or at regular time intervals said request device can request the update of an address server DNS of the communication system by sending a corresponding update request.

Finally, the communication device can additionally be provided with a user interface, e.g. a key or a speech input device, with which a user may enter a data service request by means of a single user activity, for example, by pressing a key or by means of a spoken command. Furthermore, a data service request device is provided, which thereupon requests the corresponding data service by means of a request message to a server of the communication network. The request message is addressed by means of the address identifier of the server stored and selected in the communication device.

Beside the elements depicted in FIG. 1, a communication system according to the invention can, moreover, be provided with an address server for updating the server address data stored in the corresponding terminals. In other words, the address server provides updated address data and sends them, for example upon the request from a terminal or according to pre-specifications by the network operator or data service provider, to the requested or pre-specified terminal. In addition, the address server may also take over the tasks of a DNS server.

An additional embodiment of the present invention relates to a computer program. The term "computer program" as defined by the present invention explicitly includes the term "computer program product". The computer program, which can be loaded into the internal memory of a digital computer unit, particularly of a mobile phone, comprises software code portions, which are adapted to perform the described method according to the invention, if the computer program is executed on the computer unit.

In particular said computer program can also be stored on a computer-readable medium, such as a disc, CD-ROM or an optical disc.

The invention claimed is:

1. A method for allocating an address of a server to a communication device, comprising the steps of:
   transparently for a user of the communication device selecting of a first address identifier of the server from a set of k address elements with k>1, wherein the set of k address elements contains a number n of different address identifiers with 1<n<=k, which in each case identify a server from a set of m servers with 0>m>=n; and
   storing said selected first address identifier of the server in the communication device.

2. The method according to claim 1, wherein the step of selecting further comprises:
   reading a second address identifier from a memory; and
   combining the first address identifier and the second address identifier, wherein the combined address identifier forms the selected address identifier of the server.

3. The method according to claim 2, wherein the address of the server is an IP address.

4. The method according to claim 3, wherein the first address identifier comprises a host identifier of the P address of the server, and the second address identifier comprises a network identifier of the IP address of the server.

5. The method according to claim 3, wherein the IP address of the server comprises an IPv4 address in class C format.

6. The method according to claim 2, comprising the additional steps of:
   receiving an updated second address identifier by the communication device: and
   storing the updated second address identifier in the communication device.

7. The method according to claim 1, wherein the selection of the first address identifier from the set of the k address elements is effected by means of a random function.

8. The method according to claim 1, wherein the selection of the first address identifier is effected by a calculation of a remainder of a division of a numeric identifier of the communication device by a number of the k address elements.

9. The method according to claim 1 wherein the stored selected address identifier is present in an alphanumeric plain text.

10. The method according to claim 1, comprising the additional steps of:
receiving at least one updated address element of the k address elements by the communication device; and
storing the updated address element in the communication device.

11. The method according to claim 9, comprising the additional step of:
requesting an update of an address server (DNS).

12. A communication device for allocating an address of a server, from which a data service can be requested, comprising:
a first memory for storing a set of k address elements with k>1, wherein the set of k address elements contains a number n of different address identifiers with 1<n<=k, each address identifier identifying a server from a set of m servers with 0<m<=n;
a selection unit for selecting, transparent to a user of the communication device, a first address identifier from the k address elements; and
a second memory for storing said selected first address identifier of the server.

13. The communication device according to claim 12, further comprising:
a third memory for storing a second address identifier;
a read-out unit for reading out the second address identifier from the second memory for storing the second address identifier; and
a combination unit for combining the first address identifier and the second address identifier, wherein the combined address identifier forms the selected address identifier of the server.

14. The communication device according to claim 13, further comprising:
a reception device allowing the reception of an updated second address identifier; and
a second storing device allowing the storage of the updated second address identifiers.

15. The communication device according to claim 12, wherein the selection unit can perform a random selection of the first address identifier.

16. The communication device according to claim 12, further comprising:
a memory for storing a numeric communication device identifier of the communication device; and
a second read-out unit for reading out the numeric communication device identifier from the memory for storing the numeric communication device identifier, wherein the selection of the first address identifier is effected by the selection unit by means of a calculation of a remainder of a division of the communication device identifier by a number of the k address elements.

17. The communication device according to claim 12, further comprising:
a reception device allowing the reception of at least one updated address element of the k address elements; and
a storing device allowing the storage of the at least one updated address element.

18. The communication device according to claim 17, comprising a request device for allowing a request for an update of an address server.

19. The communication device according to claim 12, further comprising:
a user interface enabling an input of a request for the data service of the server by a single user activity; and
a data service request device requesting the data service from the server by means of the selected address identifier upon an entered request for the data service.

20. A communication system, comprising:
a number m, with m>0, of servers offering a data service, wherein the m servers are identified by a number n, with n>1 and n>=m, of different address identifiers;
at least one base station being able to send and receive data packets;
a packet data network connecting the m servers and the at least one base station of the communication system; and
a plurality of communication terminals allowing a packet data communication with the at least one base station of the communication system, each communication terminal allocated an address of a server by selecting a first address identifier of the server from a set of k address elements, wherein the set of k address elements contain the n different address identifiers, with 1<n<=k.

21. The communication system according to claim 20, further comprising at least one address server for sending address identifiers of the m servers of the communication system to the communication terminals of the communication system for updating the first address identifier.

22. A computer readable medium storing software code that can be loaded into an internal memory of a communication device having a digital computer unit, said software code, when executed on the digital computer unit performs the steps of:
selecting a first address identifier of the server from a set of k address elements with k>1, wherein the set of k address elements contains a number n of different address identifiers with 1<n<=k, which in each case identify a server from a set of m servers with 0<m<=n; and
storing said selected first address identifier of the server in the communication device, said selected address identifier comprising the selected first address identifier.

* * * * *

UNITED STATES PATENT AND TRADEMARK OFFICE
CERTIFICATE OF CORRECTION

PATENT NO. : 7,333,459 B2
APPLICATION NO. : 10/182100
DATED : February 19, 2008
INVENTOR(S) : Feyerabend et al.

It is certified that error appears in the above-identified patent and that said Letters Patent is hereby corrected as shown below:

In Column 2, Line 4, delete "Ip" and insert -- IP --, therefor.

In Column 2, Lines 58-59, delete "According to the invention said object is provided by the teaching of the independent patent claims 1, 12, 20 and 22.".

In Column 2, Line 62, delete "the" and insert -- a --, therefor.

In Column 2, Line 64, after "available as" insert -- a--.

In Column 2, Line 65, delete "Advantageously" and insert -- Advantageously, --, therefor.

In Column 3, Line 7, delete "Furthermore" and insert -- Furthermore, --, therefor.

In Column 4, Lines 10-11, delete "Further advantageous embodiments and improvements of the invention are disclosed in the dependent claims.".

In Column 6, Line 14, delete "Univeral" and insert --Universal --, therefor.

In Column 6, Line 53, delete "or" and insert -- of --, therefor.

In Column 7, Line 38, delete "Asn" and insert -- ASn --, therefor.

In Column 7, Line 40, delete "Asn" and insert -- ASn --, therefor.

In Column 9, Line 27, delete "our" and insert -- out --, therefor.

In Column 9, Line 50, delete "optionally" and insert -- Optionally --, therefor.

UNITED STATES PATENT AND TRADEMARK OFFICE
CERTIFICATE OF CORRECTION

PATENT NO. : 7,333,459 B2
APPLICATION NO. : 10/182100
DATED : February 19, 2008
INVENTOR(S) : Feyerabend et al.

It is certified that error appears in the above-identified patent and that said Letters Patent is hereby corrected as shown below:

In Column 12, Line 39, in Claim 1, delete "0>m>=n;" and insert -- 0<m<=n; --, therefor.

In Column 12, Line 53, in Claim 4, delete "P" and insert -- IP --, therefor.

In Column 12, Line 62, in Claim 6, delete "device:" and insert -- device; --, therefor.

In Column 13, Line 6, in Claim 9, delete "claim 1" and insert -- claim 1, --, therefor.

In Column 13, Line 15, in Claim 11, delete "claim 9," and insert -- claim 10, --, therefor.

Signed and Sealed this

Fourteenth Day of October, 2008

JON W. DUDAS
*Director of the United States Patent and Trademark Office*